(12) United States Patent
Lechner et al.

(10) Patent No.: US 11,761,975 B2
(45) Date of Patent: Sep. 19, 2023

(54) INDUCTIVE ROTATIONAL SPEED SENSOR AND METHOD FOR PRODUCING SAME

(71) Applicant: Knorr-Bremse Systeme Fuer Nutzfahrzeuge GmbH, Munich (DE)

(72) Inventors: Klaus Lechner, Pretzfeld (DE); Andre Kluftinger, Kleinheubach (DE); Christoph Huber, Munich (DE); Ines Fruhstorfer, Zwiesel (DE); Martin Buettner, Mühldorf a, Inn (DE); Stefan Palzer, Ortenburg (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 189 days.

(21) Appl. No.: 17/312,514

(22) PCT Filed: Dec. 3, 2019

(86) PCT No.: PCT/EP2019/083502
§ 371 (c)(1),
(2) Date: Jun. 10, 2021

(87) PCT Pub. No.: WO2020/126479
PCT Pub. Date: Jun. 25, 2020

(65) Prior Publication Data
US 2022/0128588 A1  Apr. 28, 2022

(30) Foreign Application Priority Data
Dec. 18, 2018 (DE) .............. 10 2018 132 709.9

(51) Int. Cl.
*G01P 3/48* (2006.01)
*G01P 3/481* (2006.01)
*G01P 1/02* (2006.01)

(52) U.S. Cl.
CPC .............. *G01P 3/481* (2013.01); *G01P 1/026* (2013.01)

(58) Field of Classification Search
CPC .......... G01P 1/026; G01P 3/481; G01P 3/488; G01D 11/245; B29C 2045/14131;
(Continued)

(56) References Cited

U.S. PATENT DOCUMENTS

| | | | | |
|---|---|---|---|---|
| 4,680,543 A | * | 7/1987 | Kohen | G01P 3/488 174/521 |
| 5,414,355 A | * | 5/1995 | Davidson | H03K 17/9505 324/207.2 |

(Continued)

FOREIGN PATENT DOCUMENTS

| | | |
|---|---|---|
| CN | 1215363 A | 4/1999 |
| DE | 19612765 A1 | 11/1997 |

(Continued)

OTHER PUBLICATIONS

International Search Report for PCT/EP2019/083502 dated Jun. 24, 2020.

*Primary Examiner* — Thang X Le
(74) *Attorney, Agent, or Firm* — NORTON ROSE FULBRIGHT US LLP; Gerard Messina

(57) ABSTRACT

An inductive rotational speed sensor, including: a coil body having a coil and connecting lines which at least partially extend axially or radially with respect to the coil windings; a casing formed from a plastics material and at least partially enclosing the coil body; and a fixing device for facilitating a configuration of the casing, the fixing device including: for radially extending connecting lines, a material core clearance in the casing so as to fix the electrical connecting lines at a mutual spacing when configuring the casing; or an anti-twist safeguard to prevent the coil body rotating relative to a tool used for configuring the casing while the latter is (Continued)

being configured, wherein the anti-twist safeguard partially protrudes from the casing, or extends at least up to an external surface of the casing. Also described is a related method.

8 Claims, 5 Drawing Sheets

(58) Field of Classification Search
CPC ........ B29C 45/14065; B29C 45/14836; B29C 45/14639
See application file for complete search history.

(56) References Cited

U.S. PATENT DOCUMENTS

| | | | |
|---|---|---|---|
| 6,334,361 B1* | 1/2002 | De Volder | ........ B29C 45/14065 73/431 |
| 2002/0181207 A1 | 12/2002 | Karino et al. | |
| 2011/0260713 A1* | 10/2011 | Schleyer | ................. G01P 3/488 324/174 |
| 2012/0293115 A1* | 11/2012 | Ramsesh | ................. G01P 21/02 324/207.16 |
| 2015/0233735 A1* | 8/2015 | Lerchenmueller | ....... G01D 5/20 324/207.15 |
| 2018/0010933 A1* | 1/2018 | Ikeda | ................... G01D 11/245 |

FOREIGN PATENT DOCUMENTS

| | | |
|---|---|---|
| DE | 10111980 A1 | 10/2001 |
| DE | 102006021018 A1 | 11/2007 |
| DE | 102007036264 A1 | 2/2009 |
| DE | 102009054521 A1 | 2/2011 |
| EP | 194213 A1 | 9/1986 |
| EP | 1262779 A2 | 12/2002 |
| JP | 6224359 A | 2/1987 |
| JP | H5030765 U | 4/1993 |
| JP | H8327642 A | 12/1996 |
| JP | 2007170965 A | 7/2007 |
| WO | 9736729 A1 | 10/1997 |

* cited by examiner

INDUCTIVE ROTATIONAL SPEED SENSOR AND METHOD FOR PRODUCING SAME

FIELD OF THE INVENTION

The present invention relates to an inductive rotational speed sensor and to a method for producing the same. The present invention relates in particular to overmolding of coil bodies, utilizable for an axial inductive rotational speed sensor as well as for a radial inductive speed sensor.

BACKGROUND INFORMATION

Passive rotational speed sensors are utilized in the automotive industry, in particular in trucks, to measure the rotational speeds of rotatable components. A rotating speed of the respective road wheel has to be continuously determined for the correct functioning of anti-blocking systems, for example. These rotational speed sensors often are based on inductively measuring a rotational speed of a pole wheel in relation to a coil. As this is possible in a non-contacting manner, and the magnetic field moreover can readily penetrate a hermetic seal, such sensors are very robust in relation to environmental influences as they are typical in vehicle applications.

These rotational speed sensors can be produced as radial or axial sensors. In the case of axial rotational sensors, the electrical connecting line is routed axially away from the rotational speed sensor, that is to say parallel to an axial axis about which the windings of the coil run. In the case of radial rotational speed sensors, the electrical connecting line runs out of the rotational speed sensor in the radial direction (perpendicularly to the axial axis).

In the case of conventional rotational speed sensors, specific coil bodies and/or conductor rails are used for the radial and the axial rotational speed sensor, respectively, and correspondingly protected by overmolding. To this end, said coil bodies and/or conductor rails are fixed in a corresponding overmolding tool so as to prevent any twisting during the overmolding, for example. This fixing takes place, for example, by firmly holding a pole core of the coil body, the former being correspondingly shortened after the overmolding process. This procedure is complex and prone to errors because a reliable anti-twist protection by way of the pole core cannot always be guaranteed. Moreover, the shortening of the pole core is an additional operative step.

There is therefore demand for an inductive sensor which can be produced in a simplified manner.

SUMMARY OF THE INVENTION

At least part of the above-mentioned issues are solved by an inductive rotational speed sensor according to the description herein, and by a method for producing the same, according to the description herein. The further descriptions herein define further advantageous embodiments of the subject matter of the main descriptions herein.

The present invention relates to an inductive rotational speed sensor. The rotational speed sensor comprises a coil body having a coil and connecting lines which in terms of the coil windings run axially or radially away from the coil body, and a casing which is of a plastics material (for example an overmolding compound or a casting compound) and at least partially encloses the coil body. The rotational speed sensor moreover comprises fixing arrangement for facilitating a configuration of the casing. The fixing arrangement for radially extending connecting lines can comprise a material core clearance in the casing so as to fix the electrical connecting lines at a mutual spacing when configuring the casing. The fixing arrangement can also comprise an anti-twist safeguard so as to prevent the coil body rotating relative to a tool used for configuring the casing while the latter is being configured, wherein the anti-twist safeguard partially protrudes (radially) from the casing, or extends at least up to an external surface of the casing. At least one type, or both types, of the fixing arrangement is/are configured in the inductive rotated speed sensor.

The material core clearance moreover offers the advantage that rapid cooling is achieved when configuring the casing. Said material core clearance can be achieved, for example, by a protrusion or a die in the tool. The anti-twist safeguard can engage in one or a plurality of depressions/grooves in the tool so as to hold the coil body secured against twisting in the tool, for example.

The casing optionally comprises external ribs which are configured on an external surface and are suitable for clamping the sleeve of an external protective sleeve, wherein the anti-twist safeguard is part of a portion of a rib. Since the rib is generated by a groove in the tool, an engagement of the anti-twist safeguard in the groove automatically leads to an anti-twist safeguard. No modifications on the tool are required here.

The casing optionally comprises at least one plateau on which at least one rib can terminate, for example. The plateau can be configured for fixing thereon an external protective sleeve by caulking. Therefore, the plateau represents in particular a protrusion (said plateau is "standing proud") and may have the same height level as the anti-twist safeguard. The caulking utilized can be in the form of a localized plastic deformation of the protective sleeve that leads to the latter being fastened to the casing. The casing may also be slightly plastically deformed at the location.

The inductive rotational speed sensor optionally comprises a protective sleeve (for example of metal) having a trumpet-shaped peripheral widening for protecting the casing. The protective sleeve at least partially receives the casing, wherein the trumpet-shaped peripheral widening points toward the connecting lines. An O-ring seal is moreover optionally configured (for example on an external peripheral region) between the protective sleeve and the casing so as to guarantee reliable sealing. The trumpet shape facilitates the protective sleeve being pushed over the O-ring.

The trumpet-shaped peripheral widening optionally comprises fastening arrangement for fastening the protective sleeve and the casing to one another or to the tool. Accordingly, the casing can optionally have a protrusion which comes to engage with the latching hook/bayonet mount so as to achieve the fastening. For example, the fastening arrangement can have a latching hook and/or a bayonet mount, so that the protective sleeve is imparted more grip on the casing (for example in addition to the ribs and the caulking).

The casing optionally comprises complanate faces, the connecting lines to the coil body running therebetween, so as to facilitate handling during or after the configuration of the casing and to provide a further anti-twist safeguard. The complanate faces optionally comprise a labeling area (for example so as to configure thereon labeling by a laser).

The present invention also relates to a method for producing an inductive rotational speed sensor such as has been defined above, for example. The method comprises:

providing a coil body having a coil and connecting lines which in terms of the coil windings extend axially or radially;

configuring a casing which is of a plastics material (an overmolding compound, a casting compound, etc.) and at least partially encloses the coil body; and fixing at least part of the coil body while configuring the casing.

For radially extending connecting lines, the fixing can comprise introducing a die (or a protrusion) between the electrical connecting lines during the configuration of the casing, so as to fix the connecting lines at a predetermined mutual spacing. The fixing can also comprise firmly holding the coil body in a tool utilized for configuring the casing, while utilizing an anti-twist safeguard, wherein the anti-twist safeguard projects from the coil body in the radial direction so as to be held by the utilized tool in this way. The anti-twist safeguard is partially enclosed by the casing when configuring the casing.

The configuration of the casing optionally comprises using a tool which has a table which is displaceable in a linear manner, having at least two lower tool parts and an upper tool part so as to enable the coil body to be populated by a linear displacement. The terms "top" and "bottom" can be defined under the assumption that a flow direction of the plastics material of the casing is from the top toward the bottom, for example. The coil body for electrically contacting the coil can comprise two conductor rails which comprise in each case a barrier between a wire connector of the coil and the contact region for the electrical contacting by the connecting lines. The method according to exemplary embodiments in this instance (as part of configuring the casing) optionally comprises overmolding of the coil body, wherein the overmolding is carried out in such a manner that the barriers cause a deflection of an overmolding compound utilized in the overmolding. In order for the deflection to be effected, the barriers have a corresponding geometry (width, height, etc.) and are correspondingly disposed (for example in the proximity of the wire connector of the coil and perpendicular to the overmolding direction). Since a high pressure is often utilized during overmolding, the barriers offer the protection for the wire contacts to the coil (for example the corresponding weld seams), because the main pressure is initially absorbed by the barrier.

Exemplary embodiments of the present invention achieve at least part of the above-mentioned technical objects by way of the specific fixing arrangement which facilitate the production of the inductive sensors. To this end, anti-twist safeguards can be configured directly as part of the coil body so as to prevent any rotation during an exemplary overmolding process, on the one hand. Moreover, a material core clearance for the radial variant, caused by a die/protrusion, permits reliable fixing of the electrical contact during the overmolding process. Since an overmolding process leads to high mechanical stress on the electrical contacts, protecting or fixing the contacts in a reliable manner is important in order to keep the defect rate low.

This simple processing offers the further advantage that the number of required parts can be significantly reduced, this in turn leading to a reduction of costs.

The exemplary embodiments of the present invention will be better understood by the following detailed description and the appended drawings of the different exemplary embodiments, which are however not to be understood as restricting the disclosure to the specific embodiments but as serving only for the purpose of explanation and understanding.

DETAILED DESCRIPTION

Figure 1:
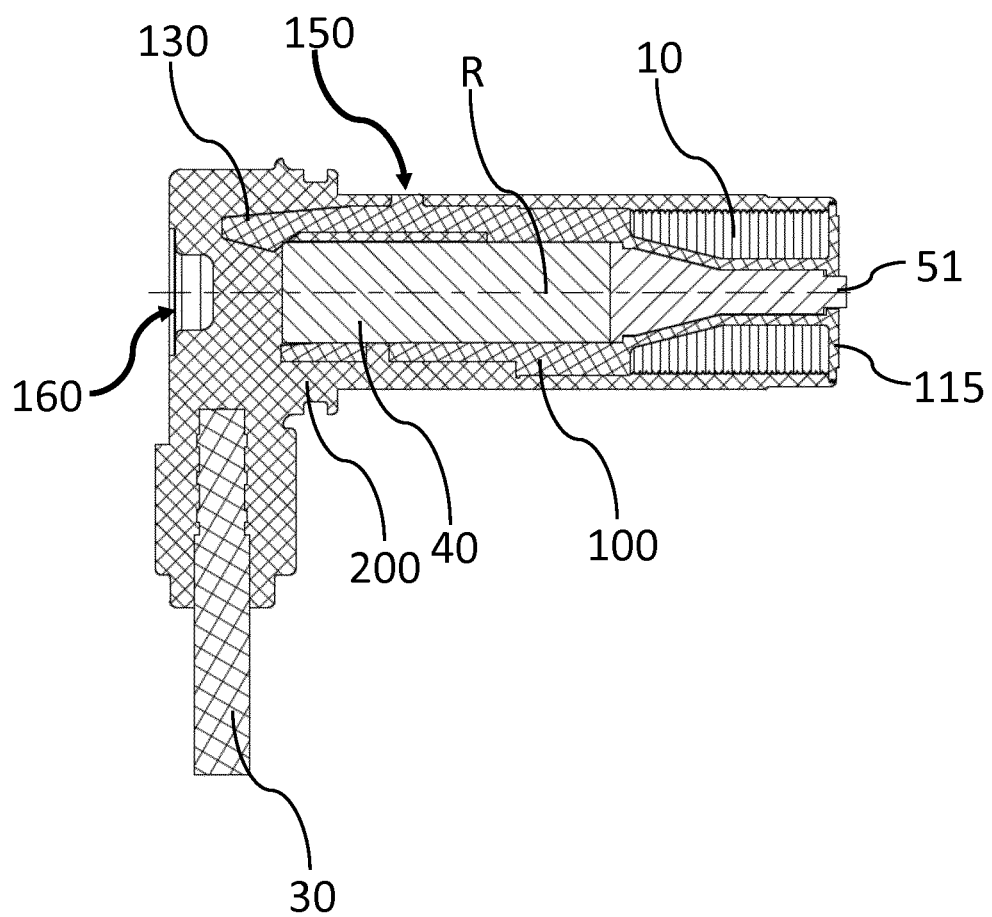
FIG. 1 shows an inductive rotational speed sensor according to one exemplary embodiment of the present invention.

FIG. 1 shows an inductive rotational speed sensor according to one exemplary embodiment of the present invention. The rotational speed sensor comprises a coil body 100 having a coil/coil windings 10 about an axial axis R, and connecting lines 30 which in terms of the coil windings 10 extend radially, for example (away from the axis R). As opposed to an axial rotational sensor in which the connecting lines are routed out so as to be (almost) parallel to the axial axis R, this rotational sensor is also referred to a radial rotational sensor. The inductive rotational sensor moreover comprises a casing 200 which is of a plastics material (for example an overmolding compound or a casting compound) and at least partially enclosed the coil body 100 so as to be protect the current-conducting lines against moisture and other environmental influences.

Moreover provided in the inductive rotational sensor are fixing arrangements 150, 160 which are configured so as to facilitate a configuration of the casing 200. To this end, the fixing arrangements 150, 160 for the radial sensor shown comprise a material core clearance 160 which is configured in the casing and is capable of keeping the electrical connecting lines 30 at a specific mutual spacing when configuring the casing 200. A reliable insulation between the two connecting lines is thus guaranteed even when high mechanical stress by virtue of configuring the casing is exerted on the respective contacts. Moreover, faster cooling upon configuring the casing 200, and thus a faster production, are enable by the material core clearance 160.

The fixing arrangement can furthermore comprise anti-twist safeguards 150 which prevent the coil body 100 rotating relative to a tool used for configuring the casing 200 while the latter is being configured. The anti-twist safeguard 150 in an exemplary manner partially protrudes from the casing 200, or extends at least up to an external surface of the casing 200, so as achieve a grip in the surrounding tool for configuring the casing.

Situated in the coil body 100 are a magnet 40 and a pole core 50, the latter by way of the bar-shaped end 51 thereof protruding from the casing 200, or the coil body, respectively, so as to efficiently conduct the magnetic flux lines, or the variations thereof, from an external region into the interior of the coil 10. The coil 10 in a front region is axially delimited by a disk-shaped end portion 115 of the coil body 100, said end portion 115 has an aperture through which the bar-shaped end 51 of the pole core 50 extends.

Finally, the coil body 100 comprises a latching hook 130 which is configured for fixing the magnet 40 in terms of an axial displacement of the latter parallel to the axial axis R. This fixing offers the advantage that the magnet 20 and the pole core 50 in the event of a production fault can be removed prior to being further overmolded, or even not joined at all. The reject rate in production is minimized in this way.

Figure 2A:
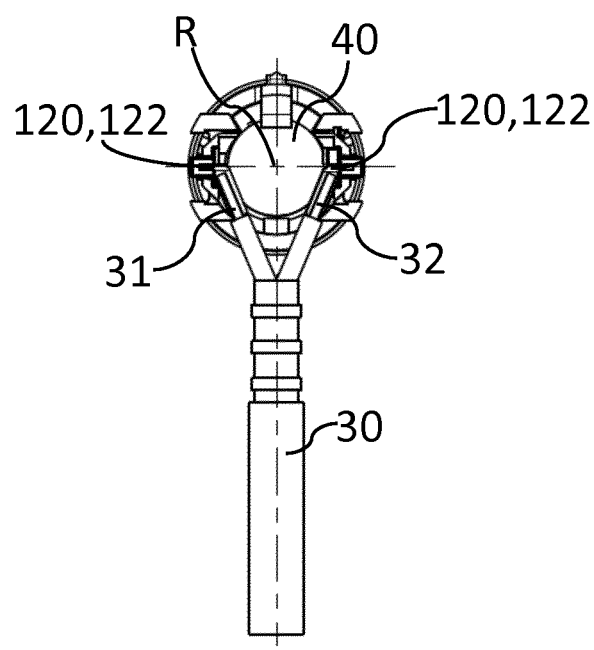
FIGS. 2A, 2B visualize the coil body being electrically contacted by the connecting lines, according to further embodiments.
Figure 2B:
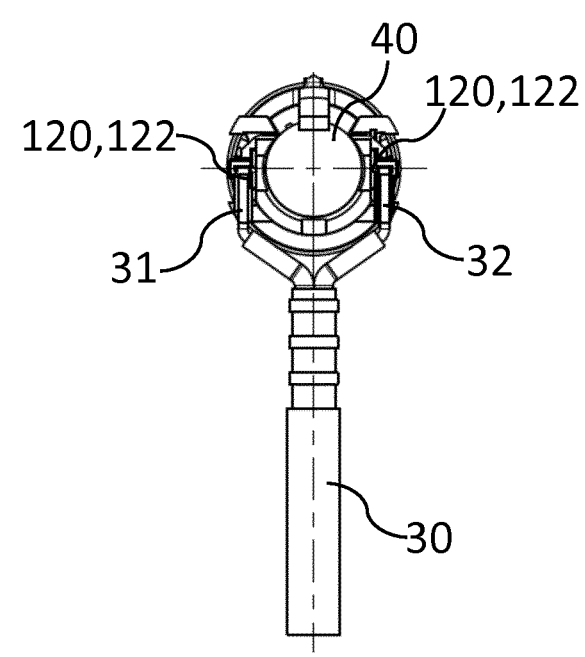

FIGS. 2A and 2B show potential electrical contacting of the coil body 100 by the connecting lines 30, or the individual lines 31, 32. In the exemplary embodiment of FIG. 2A, the two electrical lines 31, 32 are routed in Y-shaped manner to two opposite conductor rails 120 having contact portions 122. FIG. 2B shows an exemplary embodiment in which the electrical lines 31, 32 are routed in a U-shaped manner about the magnet 40 and are connected in parallel to the conductor rails 120, or the contact portions 122, respectively.

The material core clearance 160 from FIG. 1, for example, is achieved by a die which in an exemplary overmolding tool runs in the axial direction R (downward in FIGS. 2A, 2B) so as to reliably separate the two electrical connecting lines 31, 32, or the contact portions 122 connected thereto, respectively, from one another. Since a high pressure is used for the exemplary overmolding, this fixing offers certainty because the overmolding pressure cannot lead to the conductor rails 120, or the contact regions 122, respectively, being mutually compressed and electrical shorting thus being able to arise when overmolding.

Figure 3A:
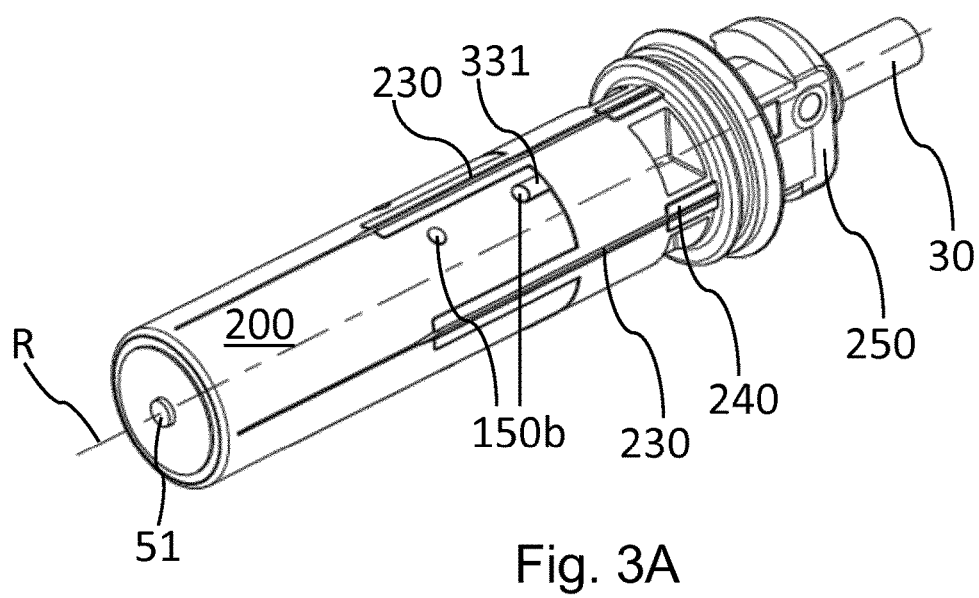
FIGS. 3A, 3B show the result of an overmolding process for an axial rotational speed sensor according to further exemplary embodiments.
Figure 3B:
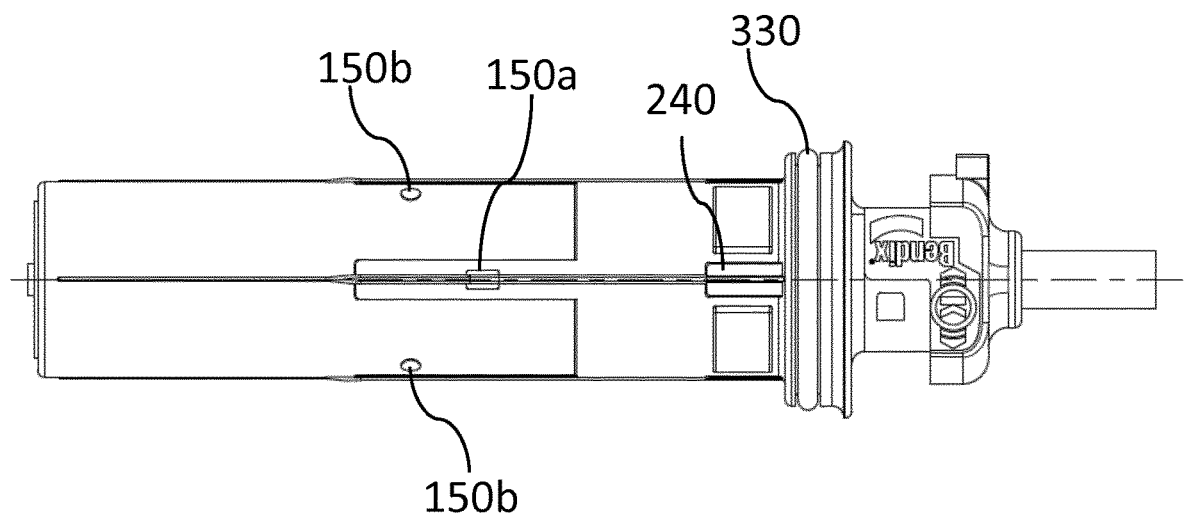

FIG. 3A shows an isometric view, and FIG. 3B shows a lateral view, of an exemplary embodiment for an axial inductive rotational speed sensor having the casing 200 (after the exemplary overmolding process, for example). The casing 200 configured in the exemplary embodiment shown comprises a multiplicity of ribs 230 (three or four, for example) which serve for subsequently fixing a protective sleeve (for example a metal sleeve) on the coil body. Likewise to be seen is the bar-shaped end 51 of the pole core 50 on the lower side of the casing 200 (see FIG. 1).

The anti-twist safeguard 150 utilized at least partially protrudes from the casing 200, or extends at least up to a surface. The anti-twist safeguards 150a, 150b may comprise various shapes of protrusions. For example, the anti-twist safeguards 150 may be arrow-shaped elements 150a or pin-shaped elements 150b. The anti-twist safeguard is achieved by anchoring or retaining the anti-twist safeguard 150 in the exemplary overmolding tool utilized. The arrow-shaped elements 150a may become part of the rib 230 (see FIG. 3B) and in the overmolding tool held in a groove with the aid of which the rib 230 is molded/cast. This arrow-shaped element 150a thus prevents the inserted coil body rotating in the tool. Plateaus 240 are optionally likewise configured as part of the casing 200. The plateaus 240 can represent end regions, for example, on which the ribs 230 terminate. The plateaus 240 serve for fixing a sleeve on the casing 200, for example by caulking, in a following method step, for example.

The protrusions 150a, 150b in the radial direction extend by at least 0.1 mm beyond the disk-shaped end portions 115, for example (see FIG. 1). It is thus made possible that the coil body 100 is fixed in an overmolding tool, for example, or another tool used for encasing. Not only rotations are prevented here. At the same time, protrusions 150a, 150b can also serve as spacers in the exemplary overmolding tool, for example when at least three protrusions 150a, 150b are configured along the circumferential direction of the coil body 100. Optionally, it is likewise possible that at least one anti-twist safeguard 150b is configured in such a manner that the casing forms a groove 331, as is illustrated in FIG. 3A.

The exemplary embodiment from FIGS. 3A and 3B furthermore comprises complanate portions 250 as part of the casing 200. These complanate portions 250 can be utilized for handling after the casing 200 has been configured, for example. Moreover, the complanate portions 250 can also serve as labeling areas so as to label the inductive rotational sensor (for example by a laser). To this end, dedicated labelling areas may be provided on the complanate portions 150.

A seal ring 330 is optionally likewise configured in a groove of a widened portion of the casing 200, so as to guarantee reliable sealing when the protective sleeve is placed thereon.

Figure 4:
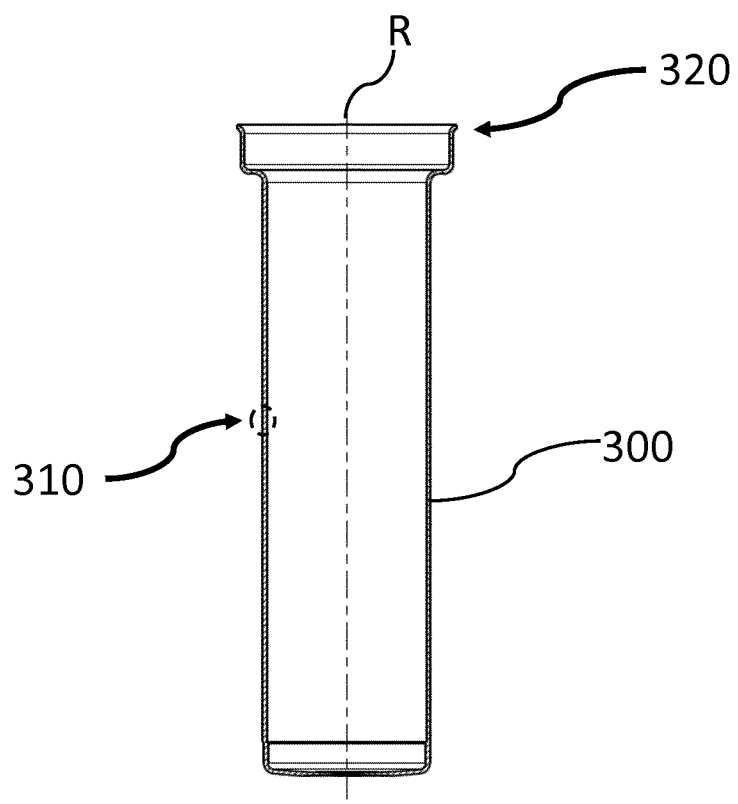
FIG. 4 shows an exemplary embodiment for a protective sleeve of the rotational speed sensor.

FIG. 4 shows an exemplary embodiment for the protective sleeve 300 utilized, the latter having a peripheral region 320 which is widened in the manner of a trumpet. The seal ring 330 (see FIG. 3B) is placed in the peripheral region 320 widened in the manner of a trumpet, so as to ensure sealing of the interior region. The protective sleeve 300 can be fastened to the underlying casing 200 by caulking 310, for example. The caulking can however likewise take place on the plateau regions 240, as can be seen in FIG. 3B, for example.

Fastening arrangement (not to be seen in FIG. 4) which serve for fastening the protective sleeve 300 to the casing 200, or in the overmolding tool, or for removing the inductive sensor conjointly with the protective sleeve 300 from the tool after the over molding procedure, respectively, can optionally be provided on the end region of the peripheral region 320 widened in the manner of a trumpet. To this end, a further latching lock or a bayonet mount can be configured on the periphery of the trumpet shape, for example.

Figure 5:
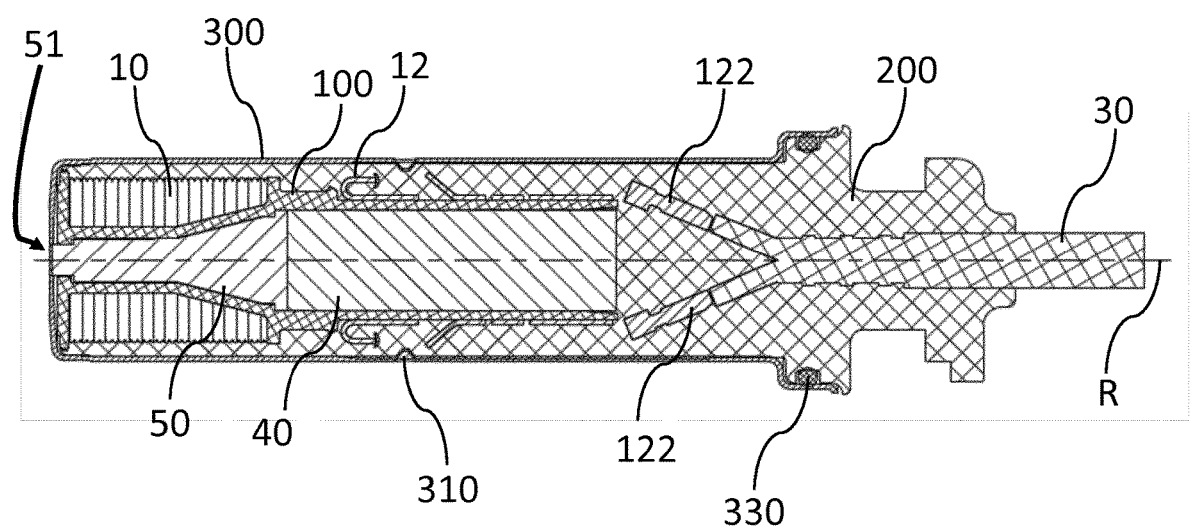
FIG. 5 shows a cross-sectional view of a completed inductive rotational speed sensor in the axial construction embodiment.

FIG. 5 shows a cross-sectional view of a completed inductive sensor in the axial construction embodiment. The electrical connecting lines 30 run into the sensor so as to be parallel to the axial axis R, spread out in a Y-shaped manner, so as to contact the contact portions 122 of the conductor rail 120. The electrical connection between the electrical connecting lines 30 and the contact portions 122 can be established by welding, soldering or else crimping, as is also the case in the other embodiments.

The conductor rails 120 are again disposed on both sides of the magnet 40 and comprise a front contact portion 12 for the coil wires from the coil 10. The conductor rails 120 form a barrier 170 which during an exemplary overmolding procedure guide an overmolding compound away from the contact region 12 of the conductor rails 120 and thus protects contacting of the coil 10. As a result, it is possible for the overmolding procedure to be carried out at a very high pressure without risking that damage to the electrical contact to the coil renders the rotational sensor useless.

The coil 10 is held in a front coil region by the coil body 100, wherein the magnet 40 and a separate pole core 50 are disposed within the coil holder 100. The coil body 100 conjointly with the conductor rails 120 and the contacting to the connecting lines 30 is protected by a casing 200 (hermetically sealed, for example). Moreover, the casing 200, which comprises a plastics material, for example, is protected by a protective sleeve 300. The protective sleeve 300 can comprise a metal, for example, so as to offer reliable protection against mechanical influences. The bar-shaped end 51 of the pole core 50 in an exemplary manner abuts the protective sleeve 300 so as to guarantee reliable transmission of the magnetic flux lines or a variation through a pole wheel running past.

According to exemplary embodiments, the contact regions 122 can be flexibly bent so that the production can be carried out in an identical manner based on one universal coil body 100. The axial rotational sensor as well as the radial rotational sensor can utilize the same components. As opposed to conventional rotational sensors, different coil bodies or conductor rails for the axial rotational sensor and the radial rotational sensor are not required. This leads to a reduction in terms of the required parts, to simple processing and assembling, and thus to a reduction in costs.

While an overmolding process can in particular be utilized for configuring the casing 200, the invention is not intended to be limited to a specific casing. Other plastics materials or methods can likewise be utilized (for example, casting). The tool utilized to this end advantageously comprises a table that is displaceable in a linear manner, having two lower tool halves and one upper tool half. The two lower tool halves serve for populating the components to be encased (coil body with coil, conductor rails, etc.) and the upper tool half is provided for supplying the material of the casing (for example the overmolding compound).

Since the cable lengths of rotational sensors in the vehicle industry can be very long (for example, 4 m and more), the table that is displaceable in a linear manner in comparison to conventional tools which for populating carry out a rotating movement, offers the particular advantage that the connecting lines/cables cannot rotate or catch in the tool. This in turn has the advantage that a fully automatic production is possible, because the in some instances long connecting cables are displaced only in a linear manner and as a result, if at all, barely cause an obstacle in the production process.

Advantages of exemplary embodiments comprise in particular:
- An anti-twist safeguard of the coil body 100 in the tool is achieved by protrusions on the coil body 100, so that any twisting during an exemplary overmolding process is reliably prevented. To this end, anti-twist safeguards of a radial-arrow shape which prevent the twisting during the production process and simultaneously offer fixing can be utilized. Moreover, axial key faces which, apart from fixing, likewise guarantee twisting during the production process, are provided as anti-twist safeguards.
- The casing comprises ribs for clamping a sleeve by plateau faces which can be utilized for caulking the sleeve.
- Faces which can be utilized as a data matrix code and can be labeled by a laser are moreover provided in a head region.
- Spring-mounted material core clearances, which are utilized for fixing the litz wire in the overmolding process, are utilized in particular for the radial variant.

The features of the invention disclosed in the description, the claims and the figures can be relevant to implementation of the invention individually as well as in any arbitrary combination.

THE LIST OF REFERENCE SIGNS IS AS FOLLOWS

10 Coil/coil windings
12 Wire contacts of the coil wire
30 (Electrical) connecting lines
31,32 Conductor of the connecting line
40 Magnetic core/magnet
50 Pole core
51 Bar-shaped end of the pole core
100 Coil body
115 Disc-shaped end portion
120 Conductor rail(s)
122 Contact region(s)
130 Latching hook
150 Anti-twist safeguard, fixing arrangement
150a Arrow-shaped elements
150b Pin elements
160 Material core clearance
170 Barrier
200 Casing
230 Ribs
240 Plateau
250 Complanate faces
300 Protective sleeve/metal sleeve
310 Caulking
320 Trumpet-shaped peripheral widening
330 O-Ring
R Axial axis

The invention claimed is:

1. An inductive rotational speed sensor, comprising:
a coil body having a coil and connecting lines which at least partially extend axially or radially with respect to the coil windings;
a casing formed from a plastics material and at least partially enclosing the coil body; and
a fixing device for facilitating a configuration of the casing, wherein the fixing device includes:
a material core clearance in the casing, for radially extending connecting lines, so as to fix the electrical connecting lines at a mutual spacing when configuring the casing;
wherein the casing has external ribs which are configured on an external surface and are for clamping a sleeve of an external protective sleeve, and wherein the anti-twist safeguard is part of a portion of a rib.

2. The inductive rotational speed sensor of claim 1, wherein the casing has at least one plateau, and wherein the plateau is configured for fixing thereon an external protective sleeve by caulking.

3. The inductive rotational speed sensor of claim 1, wherein the connecting lines extend axially, and wherein the casing has complanate faces, the connecting lines to the coil body running therebetween, so as to facilitate handling during or after the configuration of the casing and to provide a further anti-twist safeguard.

4. The inductive rotational speed sensor of claim 3, wherein the complanate faces have a labeling area.

5. An inductive rotational speed sensor, comprising:
a coil body having a coil and connecting lines which at least partially extend axially or radially with respect to the coil windings;
a casing formed from a plastics material and at least partially enclosing the coil body;
a fixing device for facilitating a configuration of the casing, wherein the fixing device includes a material core clearance in the casing, for radially extending connecting lines, so as to fix the electrical connecting lines at a mutual spacing when configuring the casing; and
a protective sleeve having a trumpet-shaped peripheral widening for protecting the casing, wherein an O-ring seal is configured between the protective sleeve and the casing so as to guarantee reliable sealing;
wherein the trumpet-shaped peripheral widening has a fastening device for fastening the protective sleeve and the casing.

6. The inductive rotational speed sensor of claim 5, wherein the fastening device has a latching hook or a bayonet mount.

7. A method for producing an inductive rotational speed sensor, the method comprising:
providing a coil body having coil windings and connecting lines which at least partially extend axially or radially with respect to the coil windings;

configuring a casing from a plastics material and which at least partially encloses the coil body; and fixing at least part of the coil body, using a tool, while configuring the casing, by performing the following:

introducing, for radially extending connecting lines, a die between the electrical connecting lines while configuring the case so as to fix the connecting lines at a predefined mutual spacing;

wherein the tool has a table that is displaceable in a linear manner and that has at least two lower tool parts and one upper tool part, so as to enable the coil bodies to be populated by a linear displacement is utilized for configuring the casing.

8. The method of claim 7, wherein the coil body for electrically contacting the coil has two conductor rails which include in each case one barrier between a wire contact of the coil and a contact region for the connecting lines, and wherein the configuration of the casing includes overmolding of the coil body, and the overmolding is carried out so that the barriers cause an non-utilized overmolding compound to be deflected when overmolding.

\* \* \* \* \*